(12) United States Patent
DeVore

(10) Patent No.: US 9,664,398 B2
(45) Date of Patent: May 30, 2017

(54) HYBRID GROUND WATER AND HEAT PUMP SYSTEM

(71) Applicant: Clyde Wesley DeVore, Louisville, KY (US)

(72) Inventor: Clyde Wesley DeVore, Louisville, KY (US)

( * ) Notice: Subject to any disclaimer, the term of this patent is extended or adjusted under 35 U.S.C. 154(b) by 502 days.

(21) Appl. No.: 13/958,603

(22) Filed: Aug. 4, 2013

(65) Prior Publication Data

US 2015/0034273 A1    Feb. 5, 2015

(51) Int. Cl.
*F24F 5/00* (2006.01)
*F24F 1/00* (2011.01)

(52) U.S. Cl.
CPC .... *F24F 5/0046* (2013.01); *F24F 2001/0088* (2013.01); *F24F 2005/0053* (2013.01); *Y02B 10/20* (2013.01); *Y02B 10/24* (2013.01); *Y02B 10/40* (2013.01); *Y02B 30/545* (2013.01)

(58) Field of Classification Search
CPC ..... F28B 3/00; F28B 3/04; F24F 3/001; F24F 3/14; F24F 2001/0085; F24F 2001/0088; F24F 2001/0092; F24F 5/0035; F24F 2005/0053; F24F 2005/0057; F24F 6/02; F24F 6/04; F24F 3/06; Y02E 60/142; F28D 20/0052; F28D 3/00; F28D 3/04; F24J 3/081
USPC .............................................. 165/45; 62/260
See application file for complete search history.

(56) References Cited

U.S. PATENT DOCUMENTS

| | | | |
|---|---|---|---|
| 1,944,992 A * | 1/1934 | Miller | F24F 5/0046 165/121 |
| 1,657,624 A | 5/1934 | Warner | |
| 2,461,449 A | 2/1949 | Smith et al. | |
| 3,169,575 A * | 2/1965 | Engalitcheff, Jr. | F28D 5/02 165/143 |
| 3,747,362 A * | 7/1973 | Mercer | F24F 3/14 62/121 |
| 3,995,689 A | 12/1976 | Cates | |
| 4,375,831 A | 3/1983 | Downing, Jr. | |
| 4,448,237 A | 5/1984 | Riley | |
| 4,674,561 A | 6/1987 | Kelley | |
| 4,698,979 A * | 10/1987 | McGuigan | F24F 1/022 62/171 |
| 5,306,331 A | 4/1994 | Auvil et al. | |
| 5,349,829 A * | 9/1994 | Tsimerman | F24F 5/0035 165/164 |
| 6,640,575 B2 * | 11/2003 | Word | F28D 5/00 165/133 |
| 6,732,544 B1 | 5/2004 | Taraboletti et al. | |
| 2011/0011557 A1 * | 1/2011 | Shelton, Jr. | E21B 7/005 165/45 |

* cited by examiner

*Primary Examiner* — Jianying Atkisson
*Assistant Examiner* — Harry Arant
(74) *Attorney, Agent, or Firm* — J. L. Simunic

(57) ABSTRACT

The present development is a building air cooling system using cool ground water, e.g. well water. Building air is cooled by coming into direct contact with cool ground water in a compact chamber using PVC packing for maximizing heat transfer efficiency, conserving space and reducing the required ground water pumping power consumption without requiring expensive compression and expansion cycles of the traditional air conditioning systems. If additional cooling is desirable, a second stage traditional air conditioning or heat pump system may also be used.

4 Claims, 1 Drawing Sheet

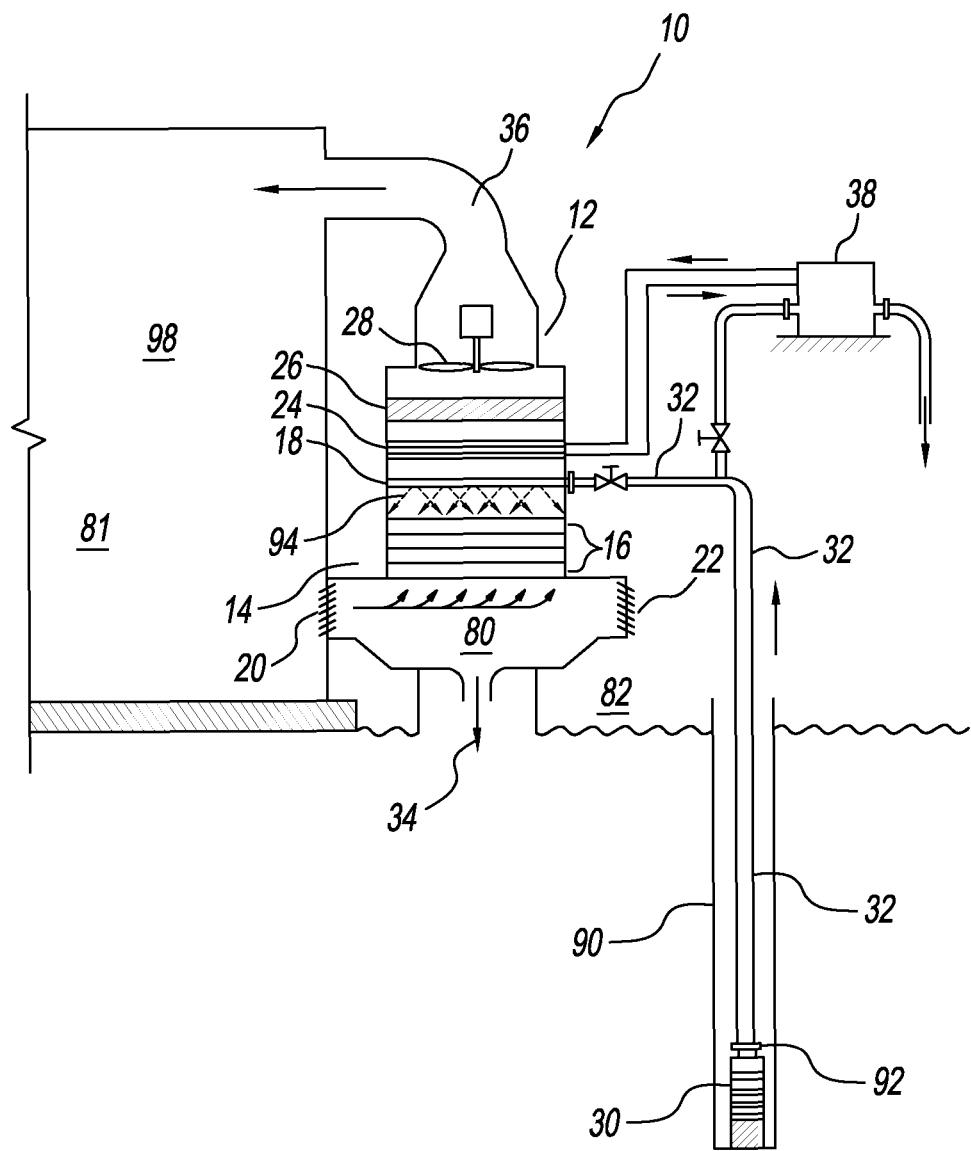

HYBRID GROUND WATER AND HEAT PUMP SYSTEM

CROSS-REFERENCE TO PRIOR APPLICATIONS, FIRST TO INVENT STATEMENT

The present application claims priority to U.S. patent application 61/681,124, which is incorporated herein by reference. The present application contains a claim to a claimed invention that has an effective filing date on or after Mar. 16, 2013.

BACKGROUND

The present development is a device that utilizes ground water to provide heating and cooling to residential and commercial buildings. The device comprises a heat pump used in combination with a deep well ground water source. The ground water serves as a source for minimum temperature when used for heating the building, and the heat can then be further supplemented by use of the heat pump. Further, the ground water serves as a source for maximum temperature when used for cooling the building, and the cooling can then be further supplemented by use of the heat pump. When the heat pump is used in combination with the ground water source, the overall efficiency of the heat pump system is improved and cost savings for the user are realized.

With the growing search for alternative energy sources, one area that seems to be overlooked is utilizing the thermal capacity from within the earth. In the past, systems were proposed for withdrawing geothermal heat from regions deep beneath the earth's surface using water as the heat-exchange medium. For example, U.S. Pat. No. 1,957,624 describes an air conditioning system that utilizes ground water for cooling and solar energy for heating. The '624 patent claims an air conditioning system wherein cool ground water from an underground reservoir is fed into a chamber and is used to alter the temperature of air passing through the chamber. In the summer, the temperature difference between the air and the water results in cooling of the air; in the winter, the temperature difference between the air and the water results in heating of the air. In U.S. Pat. No. 2,461,449, a heat pump at the earth's surface is supplied with water pumped through two pipes extending down a single bore deep well. The pipes respectively withdraw and return water at different temperatures from and to aquifers in geothermally heated regions within the earth.

However, the prior art does not teach or suggest packing the system to improve system efficiency by modifying the air temperature. The present development addresses the omissions of the prior art by providing a means whereby building air is cooled by coming into direct contact with cool ground water in a compact chamber using polyvinylchloride (PVC) packing. The resulting system maximizes heat transfer efficiency, conserves space and reduces the required ground water pumping power consumption without requiring expensive compression and expansion cycles of the traditional air conditioning systems.

SUMMARY OF THE PRESENT INVENTION

The present development is a device that utilizes ground water to provide heating and cooling to residential and commercial buildings. The device comprises a heat pump used in combination with a deep well ground water source. The ground water serves as a source for minimum temperature when used for heating the building, and the heat can then be further supplemented by use of the heat pump. Further, the ground water serves as a source for maximum temperature when used for cooling the building, and the cooling can then be further supplemented by use of the heat pump. When the heat pump is used in combination with the ground water source, the overall efficiency of the heat pump system is improved and cost savings for the user are realized.

BRIEF DESCRIPTION OF THE FIGURES

FIG. 1 is a cut-away perspective view of the present invention illustrating the relative orientation of the components, which have been exaggerated for illustration purposes only.

DETAILED DESCRIPTION OF THE INVENTION

The following description is intended to provide the reader with a better understanding of the invention. The description is not intended to be limiting with respect to any element not otherwise limited within the claims. For example, the present invention will be described in the context of use with a commonly known single-family residential building, but the teachings herein are not limited to solely to dwellings, but rather may include commercial buildings, multi-family residential buildings, schools, etc.

The present development is a building air cooling system that utilizes ground water to provide heating and cooling to residential and commercial buildings. Building air is cooled by coming into direct contact with cool ground water in a compact chamber using PVC packing for maximizing heat transfer efficiency, conserving space and reducing the required ground water pumping power consumption without requiring expensive compression and expansion cycles of the traditional air conditioning systems. If additional cooling is desirable, a second stage traditional air conditioning or heat pump system may optionally be employed.

Ground water is found to be of a comparatively uniform temperature and remains at a fairly constant year-round temperature in an aquifer, equal to the mean annual temperature of its given geographical region. Consequently, the easily accessible ground water may act as a source of heat in winter by passing it through a suitable heat exchanger in contact with the relatively cooler atmosphere, and as a heat sink in summer by passing it through a heat exchanger in contact with the relatively warmer atmosphere. In the United States, from about 35° North Latitude and greater, and in higher elevations in mountain regions, the ground water temperature varies from a high of about 60° F. to a low of about 40° F. In more southern regions, well water is frequently above about 62° F. Thus, energy efficiency may be derived by harnessing the geothermal energy from ground water.

As shown in FIG. 1, the present building air cooling system 10 comprises a heat exchanger 12 used in combination with a deep well ground water source 90. The ground water from a deep well 92 is delivered by a pump 30 and a fresh water pipe 32 into an air temperature modification unit 14. The air temperature modification unit 14 comprises a ground water discharge pipe 18 which feeds ground water 94 to a bed of polyvinylchloride (PVC) packing 16. As the ground water 94 flows through the PVC packing 16, the water 94 meets counter-flowing air 80 which comprises a mixture of building air 81, which is fed into the heat exchanger 12 from a building 98 through a building air intake 20, and fresh air 82, which has been fed into the heat exchanger 12 from the exterior environment of the building through a fresh air intake 22. When the ground water 94 meets the air 80 in the PVC packing 16, the air temperature equilibrates with the water temperature.

The thermally-equilibrated water drains to a water discharge 34 and is released from the system 10. In a preferred embodiment, the water discharge 34 feeds to a holding aquifer (not shown) which then flows back to the deep well 92. The advantage of a separate discharge aquifer is that the discharge is allowed to thermally equilibrate to then environmental temperature before mixing with the deep well water 94.

The thermally-equilibrated air passes through a set of heat pump coils 24 which further modify the air temperature. The temperature-adjusted air is then passed through a demister 26 to effect the desired humidity. A circulating fan 28 forces the humidity controlled air through a vent 36 and feeds the air back into the building 98 at a predetermined temperature and humidity.

In most instances when the ground water has a temperature of 60° F. or below, no additional cooling of the air is necessary to deliver comfortably cool air temperatures in normal summer heat. However, if the ground water temperature is greater than about 60° F., or if the atmospheric temperature is fairly high, an optional second stage compression and expansion system 38 may be added to the building air cooling system 10 to supplement the air cooling. Even with the second stage compression and expansion system, substantial cost savings may be realized because the majority of the cooling occurs in the compact PVC packed chamber unit allowing for much smaller traditional compression and expansion systems.

Any specific dimensions relevant to the building air cooling system are provided herein for the purpose of demonstrating the invention, but these dimensions are not intended to limit the scope of the invention. It is understood that one skilled in the art may make alterations to the embodiments shown and described herein without departing from the scope of the invention. For example, it is anticipated that the heat pump may be selected from any a commercially available model of heat pump that can deliver the exchange necessary for the user's personal air temperature comfort. Further, it is anticipated that the invention could be applied to any appropriate building, without departing from the scope of the invention.

What is claimed is:

1. A building air cooling system comprising:
   a) a pump;
   b) a fresh water pipe for drawing water from a deep well ground water source; and,
   c) an air temperature modification unit contained within a housing,
wherein the pump is in communication with the fresh water pipe and is configured to deliver water from a deep well ground water source through the fresh water pipe and into the air temperature modification unit, and wherein the air temperature modification unit consists of:
   1) an air mixing section comprising a building air intake to allow air from a building to enter into the air mixing section and a fresh air intake to allow air from the exterior environment of the building to enter into the air mixing section;
   2) a bed of polyvinylchloride (PVC) packing positioned above the air mixing section such that the air from the air mixing section must pass through the PVC packing as the air rises within the air temperature modification unit;
   3) a ground water discharge pipe mounted above the bed of PVC packing and connected to the fresh water pipe, wherein the ground water discharge pipe is oriented to feed ground water to the bed of PVC packing with the water counter-flowing relative to the air from the air mixing section;
   4) a water discharge positioned below the air mixing section which allows water that has been feed through the PVC packing to exit from the air temperature modification unit;
   5) a plurality of heat pump coils positioned above the ground water discharge pipe such that the air from the PVC packing section must pass over the heat pump coils as the air rises within the air temperature modification unit;
   6) a demister positioned above the heat pump coils such that the air from the heat pump coils must pass through the demister as the air rises within the air temperature modification unit; and,
   7) a vent to feed the treated air back into the building.

2. The building air cooling system of claim 1 further comprising a circulating fan to force air from the demister into a building.

3. The building air cooling system of claim 1 further comprising a second stage compression and expansion system.

4. A method of cooling and conditioning building air comprising:
   a) providing the building air cooling system of claim 1;
   b) allowing air from the building to enter into the air temperature modification unit air mixing section through the building air intake and allowing air from the exterior environment of the building to enter into the air mixing section through the fresh air intake;
   b) allowing air from the air mixing section to rise within the air temperature modification unit and to pass through the bed of polyvinylchloride (PVC) packing material;
   c) delivering water from a deep well ground source into the air temperature modification unit through the ground water discharge pipe and discharging the water into the PVC packing material such that the water contacts the air and is counter-flowing relative to the air from the air mixing section;
   d) allowing the water remain in contact with the air to thermally equilibrate the air and the water;
   e) allowing the thermally-equilibrated water to drain through the water discharge;
   f) allowing the thermally-equilibrated air to pass over the heat pump coils and allowing the air to be temperature modified by the heat pump coils;
   g) allowing the temperature-modified air to flow through the demister;
   h) forcing the temperature-modified air through the vent and into the building.

* * * * *